United States Patent
Wada et al.

(10) Patent No.: US 6,690,547 B2
(45) Date of Patent: Feb. 10, 2004

(54) SUSPENSION, HEAD GIMBAL ASSEMBLY AND MANUFACTURING METHOD OF HEAD GIMBAL ASSEMBLY

(75) Inventors: Takeshi Wada, Tokyo (JP); Norikazu Ota, Tokyo (JP); Takashi Honda, Tokyo (JP); Masashi Shiraishi, Kwai Chung (HK)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 16 days.

(21) Appl. No.: 10/060,409

(22) Filed: Feb. 1, 2002

(65) Prior Publication Data

US 2002/0171981 A1 Nov. 21, 2002

(30) Foreign Application Priority Data

Feb. 9, 2001 (JP) .................................. 2001-033393

(51) Int. Cl.$^7$ .................................................. G11B 5/60
(52) U.S. Cl. .................................................. 360/244.1
(58) Field of Search ........................... 360/244.1, 245.9, 360/246

(56) References Cited

U.S. PATENT DOCUMENTS 6,282,062 B1 * 8/2001 Shiraishi .................. 360/244.1
6,549,373 B1 * 4/2003 Shiraishi et al. ......... 360/244.1

* cited by examiner

*Primary Examiner*—Robert S. Tupper
(74) *Attorney, Agent, or Firm*—Armstrong, Kratz, Quintos, Hanson & Brooks, LLP.

(57) ABSTRACT

An HGA includes a magnetic head slider with at least one thin-film magnetic head element, a resilient flexure made of a stainless steel, supporting the magnetic head slider, a load beam made of a stainless steel, supporting the flexure, for applying a predetermined load to the magnetic head slider, a drive IC chip with a circuit for the at least one thin-film magnetic head element, a lead conductor member on which the drive IC chip is mounted, and a high-thermal-conductivity member made of a material with a higher thermal conductivity than that of the stainless steel and inserted between the lead conductor member and the load beam in a region containing at least a section on which the drive IC chip is mounted.

14 Claims, 7 Drawing Sheets

SUSPENSION, HEAD GIMBAL ASSEMBLY AND MANUFACTURING METHOD OF HEAD GIMBAL ASSEMBLY

FIELD OF THE INVENTION

The present invention relates to a suspension used in for example a hard disk drive (HDD) apparatus and for supporting a drive IC chip for a thin-film magnetic head element, to head gimbal assembly (HGA) with the suspension and to a manufacturing method of an HGA.

DESCRIPTION OF THE RELATED ART

In such HDD apparatus, the thin-film magnetic head element for writing magnetic information into and/or reading magnetic information from a magnetic disk is in general formed on a magnetic head slider flying in operation above a rotating magnetic disk. The slider is fixed at a top end section of the suspension.

Recently, recording frequency in the magnetic disk rapidly increases to satisfy the requirement forever increasing data storage capacities and densities in today's HDDs. In order to realize higher frequency recording, proposed is a chip-on-suspension structure of an HGA with a suspension for supporting both a slider and a drive IC chip of a driver circuit for the magnetic head element. According to this structure, since the length of lead lines from the driver circuit to the magnetic head element can be shortened, generation of unnecessary noises from the lead lines can be effectively suppressed resulting high frequency recording characteristics to improve. Also, it is possible to amplify a very faint output signal provided from a magnetoresistive effect (MR) read head element at a nearer position to the MR head element.

The drive IC chip used in such chip-on-suspension structure HGA is required to extremely downsize due to its mounting configuration. If the drive IC chip is so downsized, its surface area becomes greatly small causing extremely insufficient thermal radiation. Because a writing current flowing through the drive IC chip during recording operation is very large, this insufficient heat radiation of the drive IC chip will become a significant problem. In addition, since the drive IC chip is mounted on a suspension with a very small mounting space and also an electrical characteristics of the drive IC chip will be deteriorated due to noises caused by floating capacitance of its lead terminals at a higher frequency more than 500 MHz, it is necessary to fabricate the drive IC chip as a bare IC chip. Thus, the heat radiation performance of the drive IC chip will more decrease and a chip temperature will dependently increase.

Usually, a spring member of a suspension is formed by a leaf spring of a stainless steel. However, since the stainless steel has a lower thermal conductivity in comparison with that of other metal material and the stainless steel suspension is formed in a quite thin thickness, a sufficient thermal radiation effect cannot be expected when the suspension of the chip-on-suspension structure HGA is mainly made of the stainless steel.

As aforementioned, according to the conventional HGA with the chip-on-suspension structure has the following problems:

(1) Since the drive IC chip is extremely thin and small and therefore has a small surface area, it is difficult to effectively radiate a heat generated by itself;
(2) Since a stainless steel generally used for the spring member of the suspension has a relatively low thermal conductivity and an extremely thin thickness, no sufficient thermal radiation effect can be expected if the HGA is configured with a normal chip-on-suspension structure; and
(3) Since the drive IC chip is mounted on a surface of the suspension, which is faced to a magnetic recording medium, it is difficult to attach a thermal radiation mechanism directly to the drive IC chip itself.

If heat is generated in chip and it is not sufficiently radiated from the drive IC chip and thus the temperature of the drive IC chip highly increases, not only operations of the drive IC chip becomes unstable but also a thermal deformation of the drive IC chip may occur.

SUMMARY OF THE INVENTION

It is therefore an object of the present invention to provide a suspension, an HGA and a manufacturing method of an HGA, whereby more effective heat radiation of a drive IC chip can be expected.

Another object of the present invention is to provide a manufacturing method of an HGA, whereby more effective heat radiation of a drive IC chip can be expected without substantially adding a new process to a conventional manufacturing process.

According to the present invention, a suspension includes a resilient flexure made of a stainless steel for supporting a magnetic head slider with at least one thin-film magnetic head element, a load beam made of a stainless steel, supporting the flexure, for applying a predetermined load to the magnetic head slider, a lead conductor member on which a drive IC chip with a circuit for the at least one thin-film magnetic head element is to be mounted, and a high-thermal-conductivity member made of a material with a higher thermal conductivity than that of the stainless steel and inserted between the lead conductor member and the load beam in a region containing at least a section on which the drive IC chip is to be mounted.

Also, according to the present invention an HGA includes a magnetic head slider with at least one thin-film magnetic head element, a resilient flexure made of a stainless steel, supporting the magnetic head slider, a load beam made of a stainless steel, supporting the flexure, for applying a predetermined load to the magnetic head slider, a drive IC chip with a circuit for the at least one thin-film magnetic head element, a lead conductor member on which the drive IC chip is mounted, and a high-thermal-conductivity member made of a material with a higher thermal conductivity than that of the stainless steel and inserted between the lead conductor member and the load beam in a region containing at least a section on which the drive IC chip is mounted.

The high-thermal-conductivity member with a higher thermal conductivity than that of the stainless steel is inserted between the lead conductor member and the load beam in a region containing at least a section on which the drive IC chip is to be or is mounted. Thus, not only a thermal capacity of the suspension can be increased but also heat generated from the drive IC chip can be transferred through this high-thermal-conductivity member and widely dissipated resulting the drive IC chip to effectively cool. Therefore, the temperature of the drive IC chip itself can be decreased and also elevation of the local temperature of the suspension around the drive IC chip can be suppressed. As a result, a stable operation of the drive IC chip can be expected, a thermal deformation of the suspension can be prevented, and a serious heat effect to the thin-film magnetic head element can be prevented.

It is preferred that the lead conductor member is formed on the flexure directly, and that the high-thermal-conductivity member is inserted and fixed between the flexure and the load beam in the region containing at least a section on which the drive IC chip is to be or is mounted.

It is also preferred that the lead conductor member is formed by a FPC (flexible printed circuit) member, and that the high-thermal-conductivity member is inserted and fixed between the FPC member and the load beam in the region containing at least a section on which the drive IC chip is to be or is mounted.

It is further preferred that the lead conductor member has a section for mounting the drive IC chip, located at a middle of the suspension.

It is preferred that the suspension or the HGA further includes a base plate fixed to a base section of the load beam, and that the lead conductor member has a section near the base plate, for mounting the drive IC chip. In this case, preferably, the high-thermal-conductivity member is inserted and fixed between the base plate and the load beam in the region containing at least a section on which the drive IC chip is to be or is mounted.

It is also preferred that the high-thermal-conductivity member is a metal member made of a metal material containing one of Al, Cu, Mg, Al alloy, Cu alloy and Mg alloy.

According to the present invention, further, a method of manufacturing an HGA includes a step of inserting a high-thermal-conductivity member made of a material with a higher thermal conductivity than that of a stainless steel between a resilient flexure made of a stainless steel and a load beam made of a stainless steel, supporting the flexure, for applying a predetermined load to a magnetic head slider with at least one thin-film magnetic head element, a step of fixing the flexure and the load beam with each other, a step of mounting a drive IC chip with a circuit for the at least one thin-film magnetic head element on the flexure, and a step of mounting the magnetic head slider on the flexure.

Also, according to the present invention, a method of manufacturing an HGA includes a step of inserting a high-thermal-conductivity member made of a material with a higher thermal conductivity than that of a stainless steel between a load beam made of a stainless steel, for applying a predetermined load to a magnetic head slider with at least one thin-film magnetic head element and a base plate fixed to a base section of the load beam, a step of fixing the load beam and the base plate with each other, a step of fixing a resilient flexure made of a stainless steel to the load beam, a step of mounting a drive IC chip with a circuit for the at least one thin-film magnetic head element near the base plate, and a step of mounting the magnetic head slider on the flexure.

The high-thermal-conductivity member made of a material with a higher thermal conductivity than that of a stainless steel is inserted between the flexure and the load beam or the base plate and the load beam, and then the flexure and the load beam or the base plate and the load beam are fixed to each other. The HGA can be fabricated only by adding a simple process for inserting and fixing the high-thermal-conductivity member between the flexure and the load beam or the base plate and the load beam to the conventional manufacturing process. As a result, the manufacturing process will not be complicated and therefore an HGA capable of performing more effective heat radiation from a drive IC chip can be provided without increasing a manufacturing cost and a manufacturing time.

It is preferred that the fixing step includes spot-welding the flexure or the base plate and the load beam at a plurality of points.

It is also preferred that the high-thermal-conductivity member is a metal member made of a metal material containing one of Al, Cu, Mg, Al alloy, Cu alloy and Mg alloy.

Further objects and advantages of the present invention will be apparent from the following description of the preferred embodiments of the invention as illustrated in the accompanying drawings.

DESCRIPTION OF THE PREFERRED EMBODIMENTS

Figure 1:
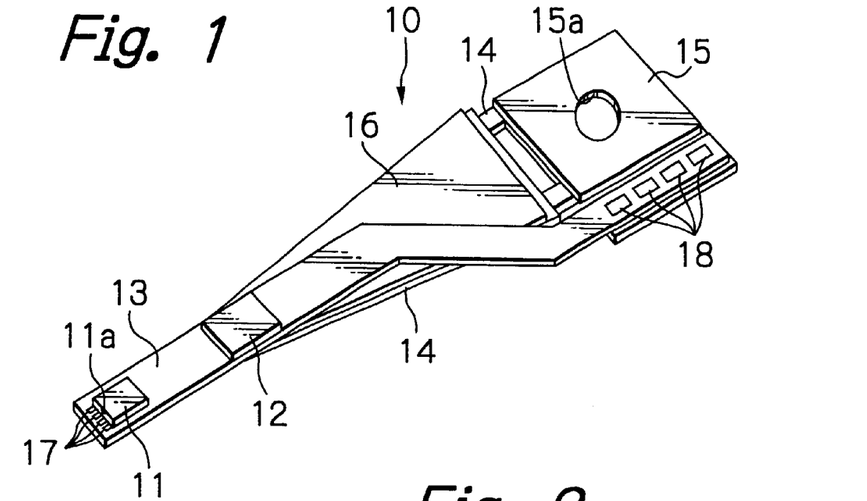
FIG. 1 shows an oblique view schematically illustrating a structure of an HGA in a preferred embodiment of the present invention.
Figure 2:
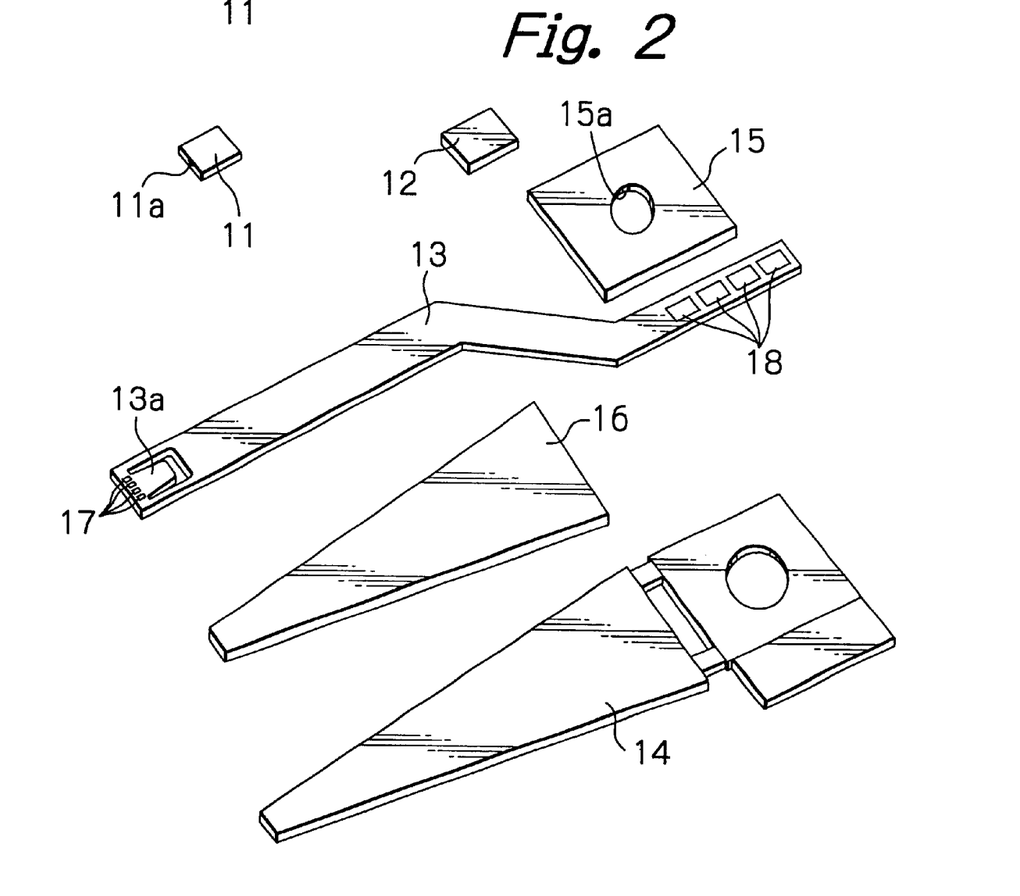
FIG. 2 shows an exploded oblique view illustrating the HGA in the embodiment of FIG. 1.
Figure 3:
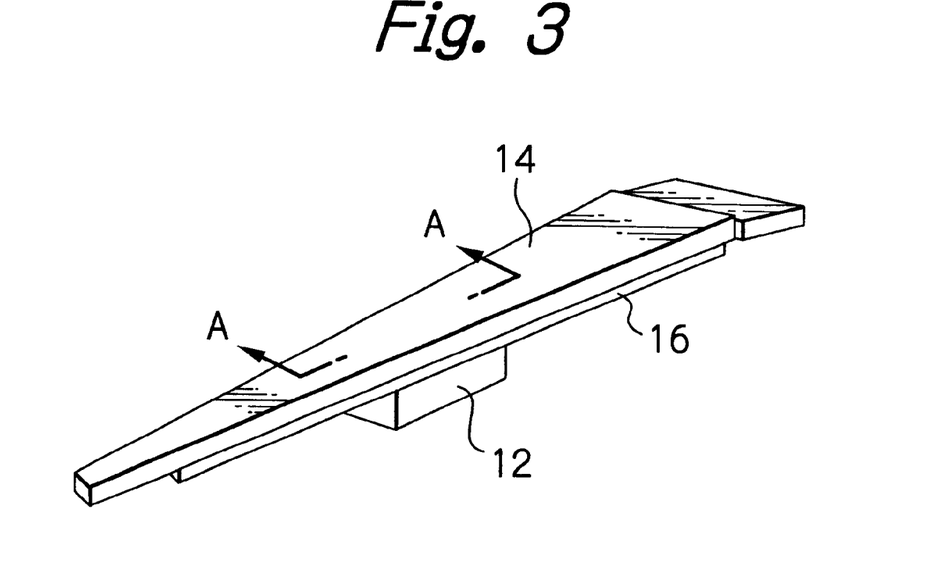
FIG. 3 shows an oblique view illustrating a middle section of the HGA in the embodiment of FIG. 1, seen from a opposite side of FIG. 1.
Figure 4:
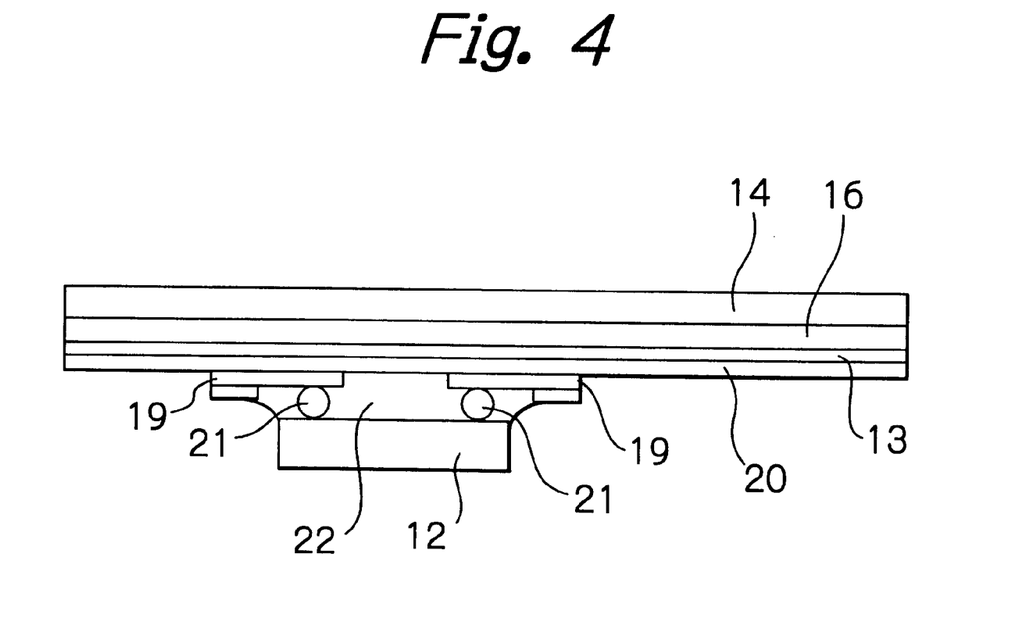
FIG. 4 shows an A—A line sectional view of FIG. 3.

FIG. 1 schematically illustrates a structure of an HGA in a preferred embodiment of the present invention, FIG. 2 illustrates the HGA of FIG. 1, FIG. 3 illustrates a middle section of the HGA of FIG. 1, seen from a opposite side of FIG. 1, and FIG. 4 is an A—A line sectional view of FIG. 3.

As shown in FIGS. 1 and 2, the HGA is assembled by fixing a magnetic head slider 11 having at least one thin-film magnetic head element to a top end section of a suspension 10, and by mounting a drive IC chip 12 for driving the head element and for amplifying a read-out signal from the head element, on a middle section of this suspension 10. The slider 11 and the drive IC chip 12 are fixed on a surface of the suspension 10, which will face to the magnetic disk surface in operation. This surface of the suspension is called hereinafter as a slider-attached surface.

The suspension 10 is substantially constituted by a resilient flexure 13 which carries the slider 11 at its top end section and supports the drive IC chip 12 at its middle section, a resilient load beam 14 that supports and fixes the flexure 13, a base plate 15 formed at a base end section of the load beam 14, and a high-thermal-conductivity member 16 with a higher thermal conductivity than that of the stainless steel.

The magnetic head slider 11 has the at least one thin-film magnetic head element consisting of a write head element and an MR read head element. Although it is a mere example, the size of the magnetic head slider 11 is 1.25 mm×1.0 mm ×0.3 mm.

In the drive IC chip 12, an integrated head amplifier constituting of the drive circuit and the read-out signal amplifying circuit is formed. Although it is a mere example, the size of the IC chip 12 is 1.4 mm×1.0 mm×0.13 mm. Thus, the drive IC chip 12 is very small in size and thin in thickness.

The flexure 13 has a flexible tongue 13a depressed by a dimple (not shown) formed on the load beam 14 and has elasticity for flexibly supporting by this tongue 13a the magnetic head slider 11 to provide a free attitude to the slider. The flexure 13 is made of in this embodiment a stainless steel plate (for example SUS304TA) with a thickness of about 25 μm and a substantially constant width.

On the flexure 13, directly formed is a thin-film pattern by a known method similar to the patterning method of forming a printed circuit board on a thin metal plate. The thin-film pattern constitutes a plurality of lead lines or trace conductors and connection pads as a lead conductor member. One ends of the trace conductors are connected to head connection pads 17 that will be connected to terminal electrodes of the magnetic head slider 11 formed at the top end section of the flexure 13, and the other ends thereof are connected to external connection pads 18 formed at the rear end section of the flexure 13. At the middle of the trace conductors, connection pads 19 (FIG. 4) for the drive IC chip 12 are formed.

The load beam 14 has elasticity for depressing the slider 11 toward the direction of a magnetic disk in operation so as to provide a stable flying height. This load beam 14 is made of in this embodiment a resilient stainless steel plate with a thickness of about 60–65 μm and supports the flexure 13 along its whole length. The load beam 14 has a shape with a width that narrows with approaching to its top end. As will be noted, in this embodiment, the suspension 10 has a three-pieces structure constituted by individual components of the flexure 13, the load beam 14 and the base plate 15. In such three-pieces structure, stiffness of the flexure 13 is set to be lower than that of the load beam 14.

The base plate 15 is made of a stainless steel plate with a thickness larger than that of the load beam 14, and is fixed to the base end section of the load beam 14 by welding. The HGA will be attached to each support arm (not shown) by mechanically swaging an attachment part 15a of the base plate 15 to the support arm.

The high-thermal-conductivity member 16 is a plate member made of a material with a higher thermal conductivity than that of the stainless steel. In this embodiment, this high-thermal-conductivity member 16 is an Al (aluminum) plate. The high-thermal-conductivity member 16 is inserted between the flexure 13 and the load beam 14 and fixed to them by spot welding at a plurality of points using a laser beam for example. A shape of the high-thermal-conductivity member 16 is substantially the same as that of a laminated section of the load beam 14.

It is desired that the high-thermal-conductivity member 16 is made of Al that has a very high thermal conductivity, a light weight and a high corrosion resistance. However, as for the high-thermal-conductivity member 16, any plate member made of metal material containing one of Al (aluminum), Cu (copper), Mg (magnesium), Al alloy, Cu alloy and Mg alloy may be used. A desired area and thickness of the high-thermal-conductivity member 16 will be described later.

As mentioned before, at the middle section of the flexure 13, the drive IC chip 12 is mounted on the slider-attached surface of the flexure 13.

The drive IC chip 12 is a bare chip and flip-chip bonded by gold balls 21 for example to the IC-chip connection pads 19 formed on an insulation material layer 20 made of polyimide as the thin-film pattern made or attached on the flexure 13 as shown in FIG. 4. In a space between the bottom of the drive IC chip 12 and the thin-film pattern, an underfill layer 22 is filled for improving the heat radiation performance, for improving mechanical strength and for covering a part of the drive IC chip 12.

Although the drive IC chip is extremely small and thin, it generates a great deal of heat due to a large write current of several tens mA flowing there through. According to the conventional structure suspension, this generated heat exerts an influence upon not only the drive IC chip itself but also the MR head element, and partially heats the stainless steel of the flexure and the load beam which constitute spring members of the suspension. The drive IC chip may be somewhat cooled by an air flow due to the rotation of the magnetic disk. However, because of the extremely small surface area of the drive IC chip, a large air cooling effect cannot be expected. Furthermore, since a clearance between the drive IC chip and a surface of the magnetic disk is very small and no contact of the drive IC chip to the disk surface is permitted, it is difficult to make some countermeasure mechanism for enhancing the air cooling effect on the drive IC chip.

Therefore, in the conventional structure suspension, the generated heat of the drive IC chip is transferred to the suspension via its terminal electrodes made of a gold or a solder but hardly transferred and thus hardly radiated in the suspension that has a low-thermal-conductivity causing only this local area of the suspension to be heated high temperature.

According to this embodiment, as will be apparent from FIGS. 3 and 4, since the high-thermal-conductivity member or the Al plate 16 is inserted and fixed between the flexure 13 and the load beam 14 to cover a region that includes at least a position at which the drive IC chip 12 is mounted, heat generated from the drive IC chip 12 can be transferred through the whole area of the Al plate 16 and widely dissipated resulting the drive IC chip 12 to effectively cool. Also, since this Al plate 16 itself functions as a heat sink so as to increase a thermal capacity of the suspension, cooling of the drive IC chip 12 is promoted in this aspect.

According to this embodiment, as aforementioned, the temperature of the drive IC chip itself can be decreased and also elevation of the local temperature of the suspension around the drive IC chip can be suppressed. Thus, a stable operation of the drive IC chip can be expected, a thermal deformation of the suspension can be prevented, and a serious heat effect to the thin-film magnetic head element can be prevented. Also, since no additional countermeasure mechanism for enhancing the air cooling effect on the drive IC chip is needed, a sufficient space can be secured between the HGA and the magnetic disk surface.

Figure 5:
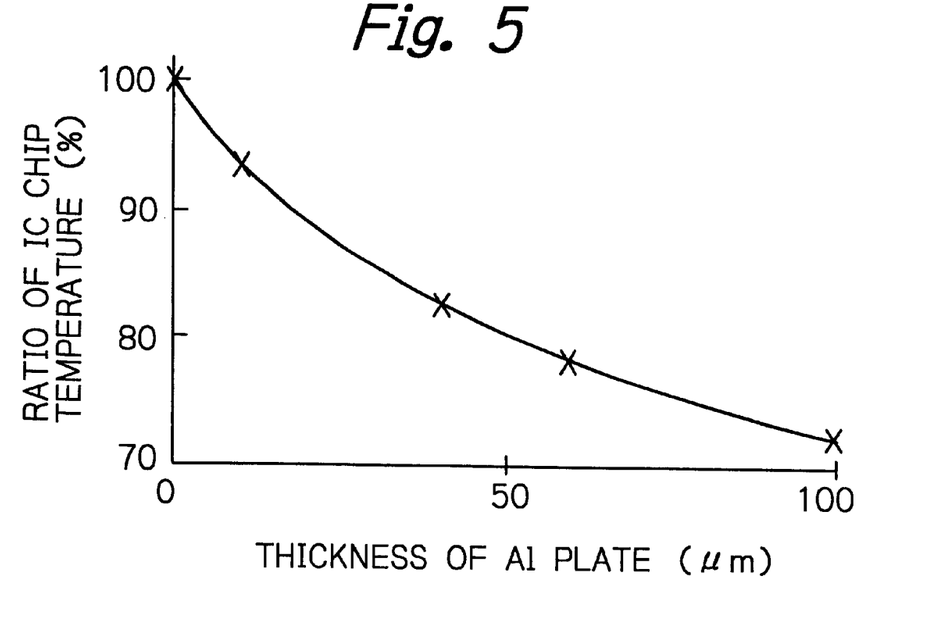
FIG. 5 shows a graph illustrating a temperature characteristic of a drive IC chip with respect to a thickness of an Al plate.

FIG. 5 illustrates a temperature characteristic of the drive IC chip 12 with respect to a thickness of the Al plate 16. The vertical axis of this figure indicates a ratio of the IC chip temperature. This ratio is 100% when the thickness of the Al plate is zero which corresponds to the conventional art with no Al plate.

As will be noted from this figure, if the Al plate 16 is inserted, the IC chip temperature decreases. The thicker the Al plate 16, the larger the thermal capacity and also the higher the thermal conductivity of the HGA. Namely, the thicker the Al plate 16, the better the heat radiation performance of the HGA causing the IC chip temperature to decrease. However, an excessive thickness of the Al plate 16 causes the plate 16 to be heavy; and thus, a mechanical characteristics of the suspension is deteriorated. An upper limit of the thickness of the Al plate 16 is about 300 mm.

Figure 6:
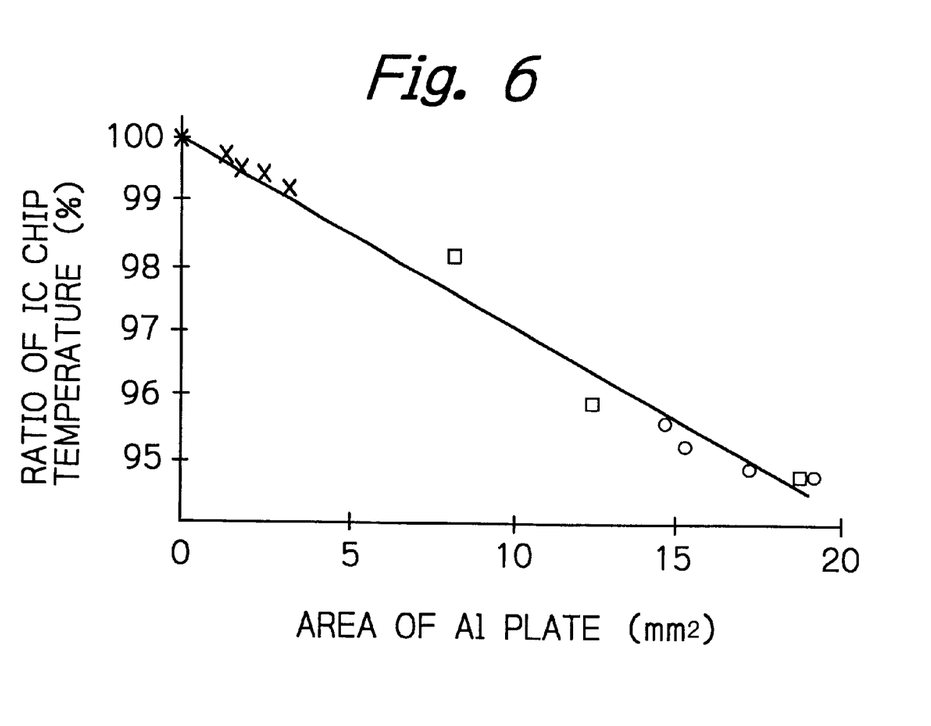
FIG. 6 shows a graph illustrating a temperature characteristic of the drive IC chip with respect to an area of the plate.

FIG. 6 illustrates a temperature characteristic of the drive IC chip 12 with respect to an area of the Al plate 16. Marks "x" in the figure indicate ratios of the IC chip temperature when an area of the Al plate around an IC chip mounted section is varied, marks "□" indicate ratios of the IC chip temperature when an area of the Al plate on the side of the base plate 15 from the IC chip mounted section is varied, and marks "○" indicate ratios of the IC chip temperature when an area of the Al plate on the side of the magnetic head slider 11 from the IC chip mounted section is varied. This ratio is 100% when the area of the Al plate is zero which corresponds to the conventional art with no Al plate.

As will be noted from this figure, if the Al plate 16 is inserted, the IC chip temperature decreases. The larger the area of the Al plate 16, the larger the thermal capacity and also the larger the surface area. Namely, the larger the area of the Al plate 16, the better the heat radiation performance of the HGA causing the IC chip temperature to decrease. However, since no heat should be transferred to the magnetic head slider 11, it is desired to make the Al plate 16 in a shape enlarged toward the side of the base plate 15 from the IC chip mounted section.

FIGS. 7a–7d and 8 illustrate parts of a manufacturing process of the HGA. Hereinafter, the manufacturing process of the HGA in this embodiment will be described with reference to these figures.

Figure 7A:
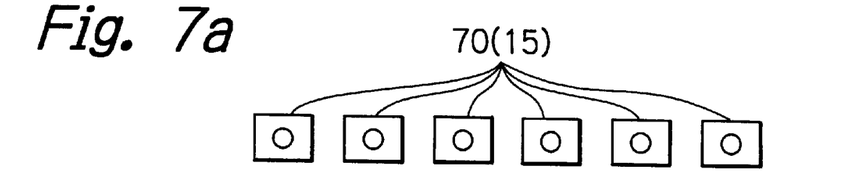
FIGS. 7a–7d show plane views illustrating parts of a manufacturing process of the HGA.
Figure 7B:
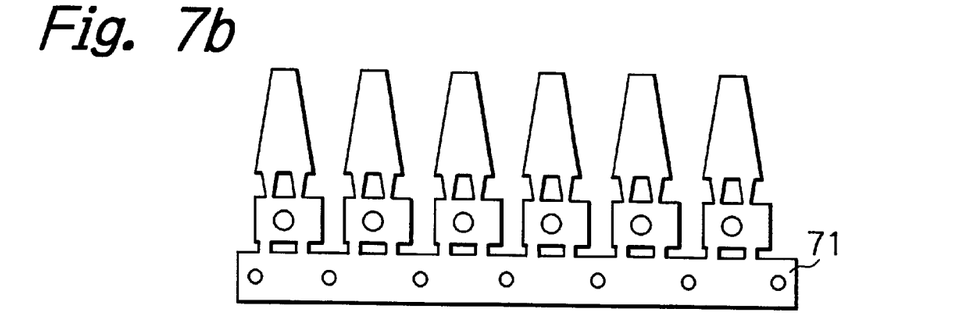
Figure 7C:
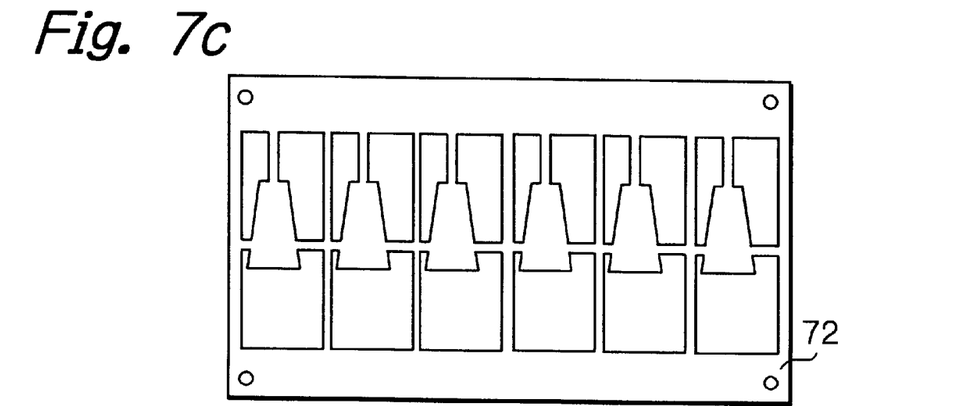
Figure 7D:
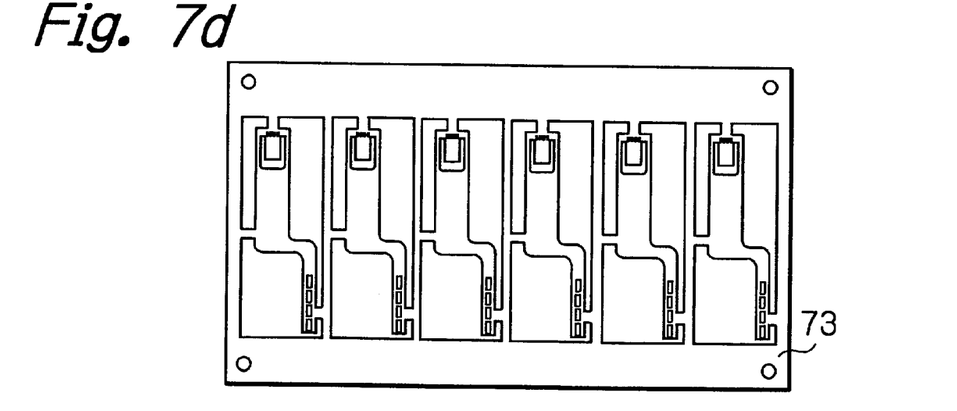

First, base plates 70 (15) shown in FIG. 7a, which are individually stamped and separated, a load beam frame 71 shown in FIG. 7b, which are formed in a state of coupling a plurality of load beams 14, an Al plate frame 72 shown in FIG. 7c, which are formed in a state of coupling a plurality of Al plates 16, and a flexure frame 73 shown in FIG. 7d, which are formed in a state of coupling a plurality of flexures 13 with trace conductors and connection pads formed thereon are prepared.

Then, the base plates 70 shown in FIG. 7a are aligned and fixed by the spot welding at a plurality of points using a laser to the load beam frame 71 shown in FIG. 7b.

Next, the load beam frame 71 to which the plurality of base plates 70 are fixed, the Al plate frame 72 shown in FIG. 7c and the flexure frame 73 shown in FIG. 7d are aligned and laminated in this order, and then these laminated frames are fixed by the spot welding at a plurality of points using a laser to each other. Thus, a suspension frame 80 shown in FIG. 8, which are formed in a state of coupling a plurality of suspensions is formed.

Figure 8:
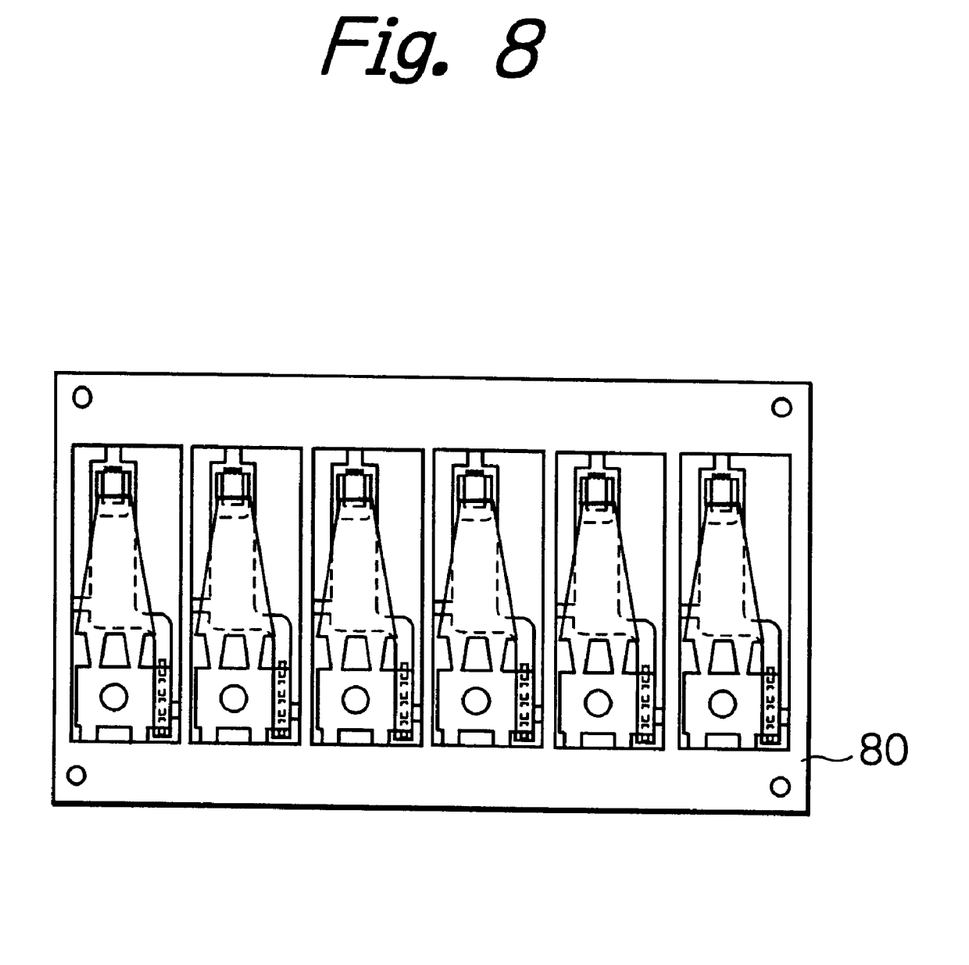
FIG. 8 shows a plane view illustrating a part of the manufacturing process of the HGA.

This suspension frame 80 is separated into individual suspensions and then a plurality of HGAs are obtained by mounting the drive IC chips 12 and the magnetic head sliders 11 on the respective suspensions in this order. In modifications, HGAs are fabricated by mounting the drive IC chips 12 and the magnetic head sliders 11 on the suspension frame 80 in this order before the separation of the frame, and then by separating the suspension frame 80.

As aforementioned, according to this embodiment, the HGA can be fabricated only by adding a simple process for inserting and fixing the Al plate frame 72 between the load beam frame 71 and the flexure frame 73 to the conventional manufacturing process. As a result, the manufacturing process will not be complicated and therefore an HGA capable of performing more effective heat radiation from a drive IC chip can be provided without increasing a manufacturing cost and a manufacturing time.

Figure 9:
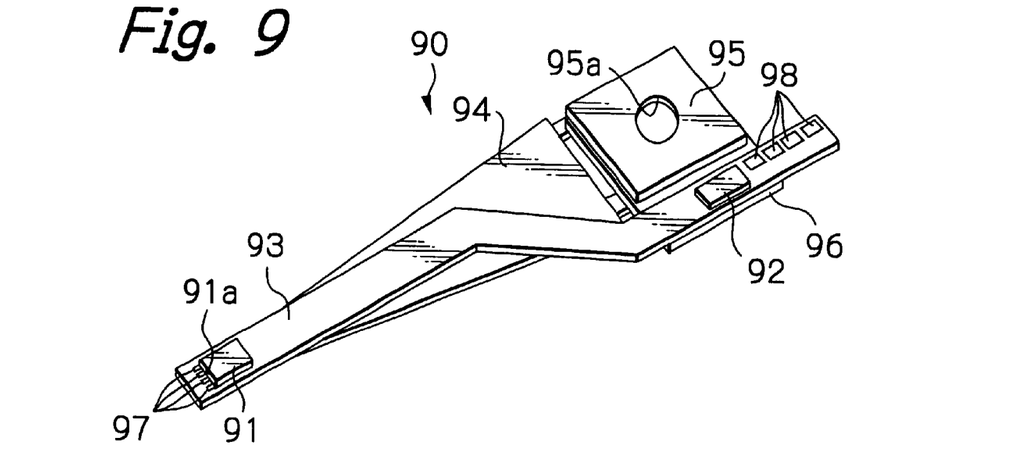
FIG. 9 shows an oblique view schematically illustrating a structure of an HGA in another embodiment of the present invention.
Figure 10:
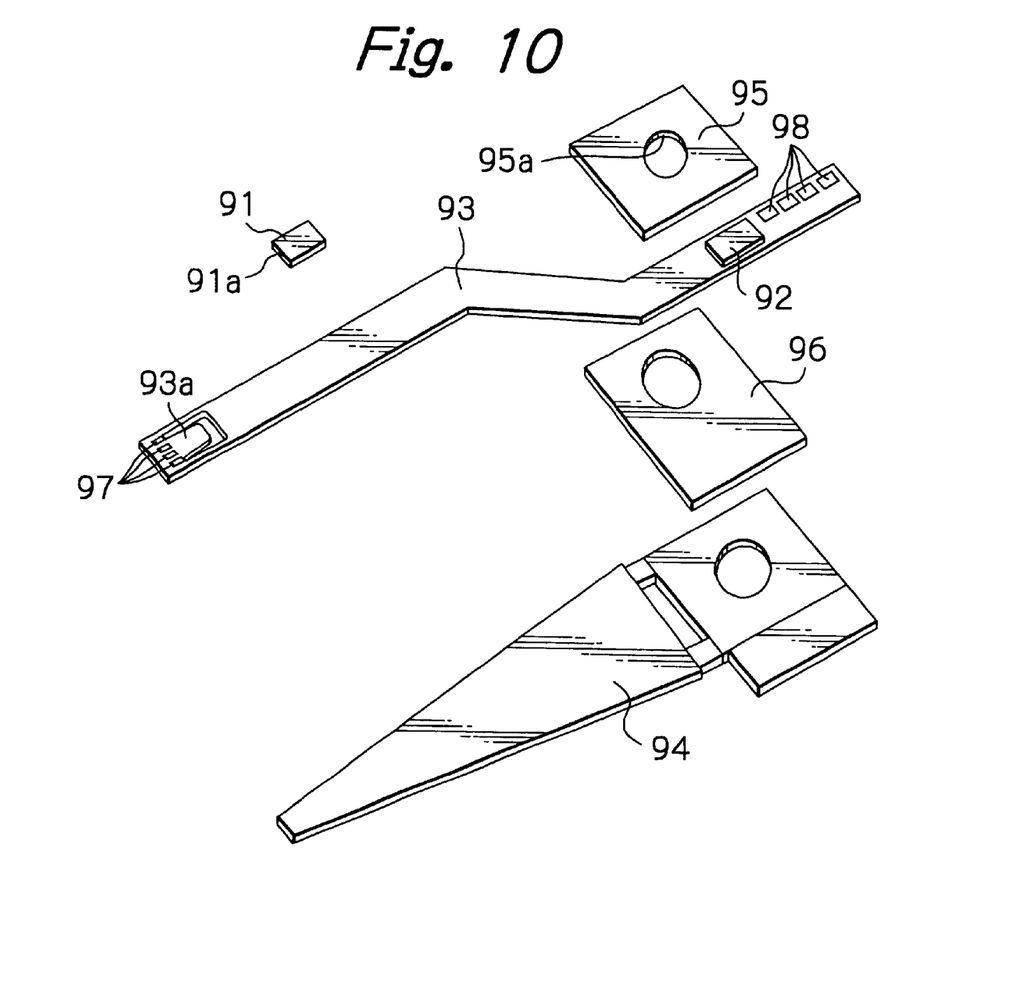
FIG. 10 shows an exploded oblique view illustrating the HGA in the embodiment of FIG. 9.

FIGS. 9 and 10 schematically illustrate a structure of an HGA in another embodiment of the present invention.

As shown in these figures, the HGA is assembled by fixing a magnetic head slider 91 having at least one thin-film magnetic head element to a top end section of a suspension 90, and by mounting a drive IC chip 92 for driving the head element and for amplifying a read-out signal from the head element, at the side of a base section of this suspension 90. The slider 91 and the drive IC chip 92 are fixed on a surface of the suspension 90, which will face to the magnetic disk surface in operation. This surface of the suspension is called hereinafter as a slider-attached surface.

The suspension 90 is substantially constituted by a resilient flexure 93 which carries the slider 91 at its top end section and supports the drive IC chip 92 at its middle section, a resilient load beam 94 that supports and fixes the flexure 93, a base plate 95 formed at a base end section of the load beam 94, and a high-thermal-conductivity member 96 with a higher thermal conductivity than that of the stainless steel.

The magnetic head slider 91 has the at least one thin-film magnetic head element consisting of a write head element and an MR read head element. Although it is a mere example, the size of the magnetic head slider 91 is 1.25 mm×1.0 mm×0.3 mm.

In the drive IC chip 92, an integrated head amplifier constituting of the drive circuit and the read-out signal amplifying circuit is formed. Although it is a mere example, the size of the IC chip 92 is 1.4 mm×1.0 mm×0.13 mm. Thus, the drive IC chip 92 is very small in size and thin in thickness.

The flexure 93 has a flexible tongue 93a depressed by a dimple (not shown) formed on the load beam 94 and has elasticity for flexibly supporting by this tongue 93a the magnetic head slider 91 to provide a free attitude to the slider. The flexure 93 is made of in this embodiment a stainless steel plate (for example SUS304TA) with a thickness of about 25 $\mu$m and a constant width.

On the flexure 93, directly formed is a thin-film pattern by a known method similar to the patterning method of forming a printed circuit board on a thin metal plate. The thin-film pattern constitutes a plurality of lead lines or trace conductors and connection pads as a lead conductor member. One ends of the trace conductors are connected to head connection pads 97 that will be connected to terminal electrodes of the magnetic head slider 91 formed at one end section (top end section) of the flexure 93, and the other ends thereof are connected to external connection pads 98 formed at the other end section (rear end section) of the flexure 93. Near the other ends of the trace conductors, connection pads (not shown) for the drive IC chip 92 are formed so as to locate at the side of the base plate 95.

The load beam 94 has elasticity for depressing the slider 91 toward the direction of a magnetic disk in operation so as to provide a stable flying height. This load beam 94 is made of in this embodiment a resilient stainless steel plate with a thickness of about 60–65 μm and supports the flexure 93 along its whole length. The load beam 94 has a shape with a width that narrows with approaching to its top end. As will be noted, in this embodiment, the suspension 90 has a three-pieces structure constituted by individual components of the flexure 93, the load beam 94 and the base plate 95. In such three-pieces structure, stiffness of the flexure 93 is set to be lower than that of the load beam 94.

The base plate 95 is made of a stainless steel plate with a thickness larger than that of the load beam 94, and is fixed to the base end section of the load beam 94 by welding. The HGA will be attached to each support arm (not shown) by mechanically swaging an attachment part 95a of the base plate 95 to the support arm.

The high-thermal-conductivity member 96 is a plate member made of a material with a higher thermal conductivity than that of the stainless steel. In this embodiment, this high-thermal-conductivity member 96 is an Al (aluminum) plate. The high-thermal-conductivity member 96 is inserted between the load beam 94 and the base plate 95 and fixed to them by spot welding at a plurality of points using a laser beam for example. A shape of the high-thermal-conductivity member 96 is substantially the same as that of a laminated section of the load beam 94.

It is desired that the high-thermal-conductivity member 96 is made of Al that has a very high thermal conductivity, a light weight and a high corrosion resistance. However, as for the high-thermal-conductivity member 96, any plate member made of metal material containing one of Al (aluminum), Cu (copper), Mg (magnesium), Al alloy, Cu alloy and Mg alloy may be used.

As mentioned before, near the other end of the flexure 93, namely at the side position of the base plate 95, the drive IC chip 92 is mounted on the slider-attached surface of the flexure 93.

As well as that in the embodiment of FIGS. 1–4, the drive IC chip 92 is a bare chip and flip-chip bonded by gold balls for example to the IC-chip connection pads formed on an insulation material layer made of polyimide as the thin-film pattern made or attached on the flexure 93. In a space between the bottom of the drive IC chip 92 and the thin-film pattern, an underfill layer is filled for improving the heat radiation performance, for improving mechanical strength and for covering a part of the drive IC chip 92.

In this embodiment, since the high-thermal-conductivity member or the Al plate 96 is inserted and fixed between the load beam 94 and the base plate 95 to cover a region that includes at least a position at which the drive IC chip 92 is mounted, heat generated from the drive IC chip 92 can be transferred through the whole area of the Al plate 96 and widely dissipated to the base plate 95 with a large thermal capacity and to the support arm resulting the drive IC chip 92 to effectively cool. Also, since this Al plate 96 itself functions as a heat sink so as to increase a thermal capacity of the suspension, cooling of the drive IC chip 92 is promoted in this aspect.

According to this embodiment, the temperature of the drive IC chip itself can be decreased and also elevation of the local temperature of the suspension around the drive IC chip can be suppressed. Thus, a stable operation of the drive IC chip can be expected, a thermal deformation of the suspension can be prevented, and a serious heat effect to the thin-film magnetic head element can be prevented. Also, since no additional countermeasure mechanism for enhancing the air cooling effect on the drive IC chip is needed, a sufficient space can be secured between the HGA and the magnetic disk surface.

A manufacturing process, operations and advantages of a thickness and an area of the Al plate, and others in this embodiment are substantially the same as those in the embodiment of FIGS. 1–4.

In this embodiment, the drive IC chip 92 is mounted on the flexure 93 before assembling it into the HGA so as to simplify the assembling process of the HGA. In modifications, after assembling a suspension, the drive IC chip 92 may be mounted to form an HGA as well as the embodiment of FIGS. 1–4.

Figure 11:
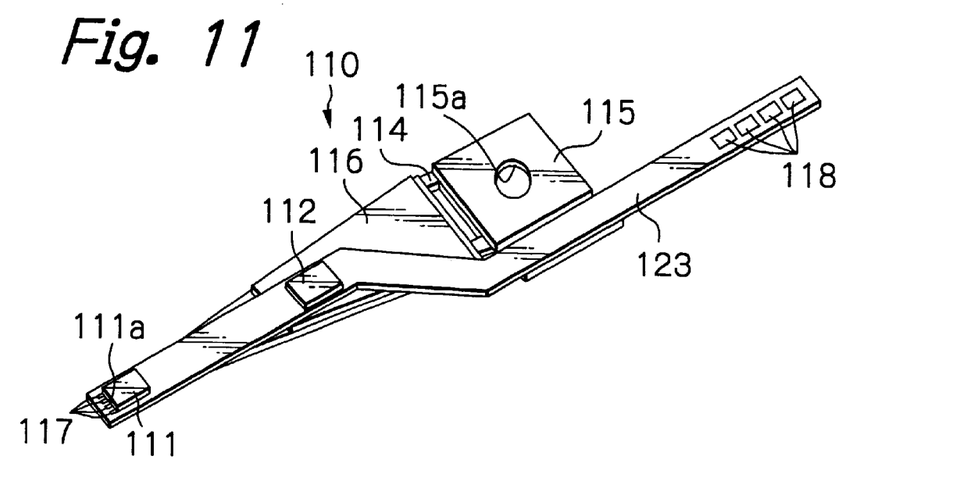
FIG. 11 shows an oblique view schematically illustrating a structure of an HGA in a further embodiment of the present invention.
Figure 12:
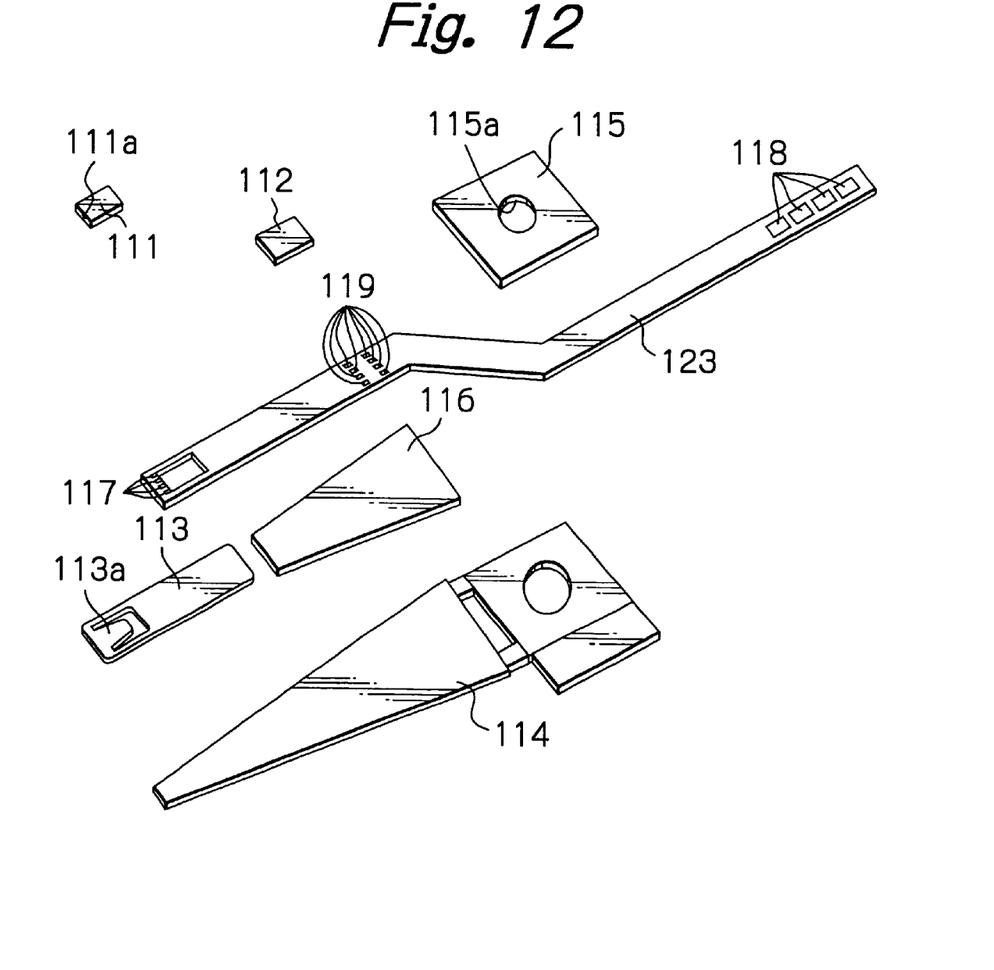
FIG. 12 shows an exploded oblique view illustrating the HGA in the embodiment of FIG. 11.

FIGS. 11 and 12 schematically illustrate a structure of an HGA in a further embodiment of the present invention.

As shown in these figures, the HGA is assembled by fixing a magnetic head slider 111 having at least one thin-film magnetic head element to a top end section of a suspension 110, and by mounting a drive IC chip 112 for driving the head element and for amplifying a read-out signal from the head element, on a middle section of this suspension 110. The slider 111 and the drive IC chip 112 are fixed on a surface of the suspension 110, which will face to the magnetic disk surface in operation.

The suspension 110 is substantially constituted by a resilient flexure 113 which carries the slider 111 at its top end section, a resilient load beam 114 that supports and fixes the flexure 113 at its top end section, a base plate 115 formed at a base end section of the load beam 114, a high-thermal-conductivity member 116 with a higher thermal conductivity than that of the stainless steel, and a flexible printed circuit (FPC) 123 which supports the drive IC chip 112 at its middle section and has a plurality of lead lines or trace conductors and connection pads electrically connected to the magnetic head slider 111 and the drive IC chip 112 as a lead conductor member.

The magnetic head slider 111 has the at least one thin-film magnetic head element consisting of a write head element and an MR read head element. Although it is a mere example, the size of the magnetic head slider 111 is 1.25 mm×1.0 mm×0.3 mm.

In the drive IC chip 112, an integrated head amplifier constituting of the drive circuit and the read-out signal amplifying circuit is formed. Although it is a mere example, the size of the IC chip 112 is 1.4 mm×1.0 mm×0.13 mm. Thus, the drive IC chip 112 is very small in size and thin in thickness.

The flexure 113 has a flexible tongue 113a depressed by a dimple (not shown) formed on the load beam 114 and has elasticity for flexibly supporting by this tongue 113a the magnetic head slider 111 to provide a free attitude to the slider. The flexure 113 is made of in this embodiment a stainless steel plate (for example SUS304TA) with a thickness of about 25 μm and a constant width.

The FPC 123 is constituted by forming the trace conductors and the connection pads as a lead conductor member on a resin layer and by forming a cover layer made of resin on the trace conductors. This FPC 123 is fixed by an adhesive on the flexure 113, the high-thermal-conductivity member 116 and the load beam 114.

One ends of the trace conductors formed on the FPC 123 are connected to head connection pads 117 that are connected to terminal electrodes of the magnetic head slider 111 formed at one end section (top end section) of the FPC 123, and the other ends thereof are connected to external connection pads 118 formed at the other end section (rear end section) of the FPC 123. At the middle of the trace conductors, connection pads 119 for the drive IC chip 112 are formed.

The load beam 114 has elasticity for depressing the slider 111 toward the direction of a magnetic disk in operation so as to provide a stable flying height. This load beam 114 is made of in this embodiment a resilient stainless steel plate with a thickness of about 60–65 µm and supports the flexure 113 at its top end section, the high-thermal-conductivity member 116 at its middle section and the FPC 123 at its rear end section. The load beam 114 has a shape with a width that narrows with approaching to its top end. As will be noted, in this embodiment, the suspension 110 has a four-pieces structure constituted by individual components of the flexure 113, the FPC 123, the load beam 114 and the base plate 115. In such four-pieces structure, stiffness of the flexure 113 is set to be lower than that of the load beam 114.

The base plate 115 is made of a stainless steel plate with a thickness larger than that of the load beam 114, and is fixed to the base end section of the load beam 114 by welding. The HGA will be attached to each support arm (not shown) by mechanically swaging an attachment part 15a of the base plate 115 to the support arm.

The high-thermal-conductivity member 116 is a plate member made of a material with a higher thermal conductivity than that of the stainless steel. In this embodiment, this high-thermal-conductivity member 116 is an Al (aluminum) plate. The high-thermal-conductivity member 116 is inserted between the FPC 123 and the load beam 114 at the rear side of the flexure 113 and fixed to the load beam 114 by spot welding at a plurality of points using a laser beam for example. A shape of the high-thermal-conductivity member 116 is substantially the same as that of a laminated section of the load beam 114.

It is desired that the high-thermal-conductivity member 116 is made of Al that has a very high thermal conductivity, a light weight and a high corrosion resistance. However, as for the high-thermal-conductivity member 116, any plate member made of metal material containing one of Al (aluminum), Cu (copper), Mg (magnesium), Al alloy, Cu alloy and Mg alloy may be used.

As mentioned before, at the middle section of the FPC 123, the drive IC chip 112 is mounted on a surface of the FPC 123, which is the same surface of mounting the slider 111 and will face to the magnetic disk surface in operation.

As well as that in the embodiment of FIGS. 1–4, the drive IC chip 112 is a bare chip and flip-chip bonded by gold balls for example to the IC-chip connection pads formed on the FPC 123. In a space between the bottom of the drive IC chip 112 and the thin-film pattern of the FPC 123, an underfill layer is filled for improving the heat radiation performance, for improving mechanical strength and for covering a part of the drive IC chip 112.

In this embodiment, since the high-thermal-conductivity member or the Al plate 116 is inserted and fixed between the FPC 123 and the load beam 114 to cover a region that includes at least a position at which the drive IC chip 112 is mounted, heat generated from the drive IC chip 112 can be transferred through the whole area of the Al plate 116 and widely dissipated resulting the drive IC chip 112 to effectively cool. Also, since this Al plate 116 itself functions as a heat sink so as to increase a thermal capacity of the suspension, cooling of the drive IC chip 112 is promoted in this aspect.

According to this embodiment, the temperature of the drive IC chip itself can be decreased and also elevation of the local temperature of the suspension around the drive IC chip can be suppressed. Thus, a stable operation of the drive IC chip can be expected, a thermal deformation of the suspension can be prevented, and a serious heat effect to the thin-film magnetic head element can be prevented. Also, since no additional countermeasure mechanism for enhancing the air cooling effect on the drive IC chip is needed, a sufficient space can be secured between the HGA and the magnetic disk surface.

A manufacturing process, operations and advantages of a thickness and an area of the Al plate, and others in this embodiment are substantially the same as those in the embodiment of FIGS. 1–4.

In modifications of this embodiment, the drive IC chip 112 may be mounted at the base section of the suspension 110 and also the Al plate 116 may be inserted between the load beam 114 and the base plate 115 as well as the embodiment of FIGS. 7 and 8.

Many widely different embodiments of the present invention may be constructed without departing from the spirit and scope of the present invention. It should be understood that the present invention is not limited to the specific embodiments described in the specification, except as defined in the appended claims.

What is claimed is:

1. A suspension comprising:
 a resilient flexure made of a stainless steel for supporting a magnetic head slider with at least one thin-film magnetic head element;
 a load beam made of a stainless steel, supporting said flexure, for applying a predetermined load to said magnetic head slider;
 a lead conductor member on which a drive IC chip with a circuit for said at least one thin-film magnetic head element is to be mounted; and
 a high-thermal-conductivity member made of a material with a higher thermal conductivity than that of the stainless steel and inserted between said lead conductor member and said load beam in a region containing at least a section on which said drive IC chip is to be mounted.

2. The suspension as claimed in claim 1, wherein said lead conductor member is formed on said flexure directly, and wherein said high-thermal-conductivity member is inserted and fixed between said flexure and said load beam in said region containing at least a section on which said drive IC chip is to be mounted.

3. The suspension as claimed in claim 1, wherein said lead conductor member is formed by a FPC member, and wherein said high-thermal-conductivity member is inserted and fixed between said FPC member and said load beam in said region containing at least a section on which said drive IC chip is to be mounted.

4. The suspension as claimed in claim 1, wherein said lead conductor member has a section for mounting said drive IC chip, said section being located at a middle of said suspension.

5. The suspension as claimed in claim 1, wherein said suspension further comprises a base plate fixed to a base section of said load beam, and wherein said lead conductor member has a section near said base plate, for mounting said drive IC chip.

6. The suspension as claimed in claim 5, wherein said high-thermal-conductivity member is inserted and fixed between said base plate and said load beam in said region containing at least a section on which said drive IC chip is to be mounted.

7. The suspension as claimed in claim 1, wherein said high-thermal-conductivity member is a metal member made of a metal material containing one of an aluminum, a copper, a magnesium, an aluminum alloy, a copper alloy and a magnesium alloy.

8. A head gimbal assembly comprising:

a magnetic head slider with at least one thin-film magnetic head element;

a resilient flexure made of a stainless steel, supporting said magnetic head slider;

a load beam made of a stainless steel, supporting said flexure, for applying a predetermined load to said magnetic head slider;

a drive IC chip with a circuit for said at least one thin-film magnetic head element;

a lead conductor member on which said drive IC chip is mounted; and a high-thermal-conductivity member made of a material with a higher thermal conductivity than that of the stainless steel and inserted between said lead conductor member and said load beam in a region containing at least a section on which said drive IC chip is mounted.

9. The head gimbal assembly as claimed in claim 8, wherein said lead conductor member is formed on said flexure directly, and wherein said high-thermal-conductivity member is inserted and fixed between said flexure and said load beam in said region containing at least a section on which said drive IC chip is mounted.

10. The head gimbal assembly as claimed in claim 8, wherein said lead conductor member is formed by a FPC member, and wherein said high-thermal-conductivity member is inserted and fixed between said FPC member and said load beam in said region containing at least a section on which said drive IC chip is mounted.

11. The head gimbal assembly as claimed in claim 8, wherein said lead conductor member has a section at a middle thereof, for mounting said drive IC chip.

12. The head gimbal assembly as claimed in claim 8, wherein said head gimbal assembly further comprises a base plate fixed to a base section of said load beam, and wherein said lead conductor member has a section near said base plate, for mounting said drive IC chip.

13. The head gimbal assembly as claimed in claim 12, wherein said high-thermal-conductivity member is inserted and fixed between said base plate and said load beam in said region containing at least a section on which said drive IC chip is mounted.

14. The head gimbal assembly as claimed in claim 8, wherein said high-thermal-conductivity member is a metal member made of a metal material containing one of an aluminum, a copper, a magnesium, an aluminum alloy, a copper alloy and a magnesium alloy.

* * * * *